US009228612B2

(12) United States Patent
Okamoto et al.

(10) Patent No.: US 9,228,612 B2
(45) Date of Patent: Jan. 5, 2016

(54) TAPERED ROLLER BEARING

(71) Applicant: JTEKT CORPORATION, Osaka-shi, Osaka (JP)

(72) Inventors: Daisuke Okamoto, Osaka (JP); Akiyuki Suzuki, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/570,198

(22) Filed: Dec. 15, 2014

(65) Prior Publication Data

US 2015/0176648 A1 Jun. 25, 2015

(30) Foreign Application Priority Data

Dec. 25, 2013 (JP) .................. 2013-266844
Mar. 24, 2014 (JP) .................. 2014-060188

(51) Int. Cl.
*F16C 33/46* (2006.01)
*F16C 33/58* (2006.01)
*F16C 33/66* (2006.01)
*F16C 19/36* (2006.01)

(52) U.S. Cl.
CPC ........... *F16C 33/6681* (2013.01); *F16C 19/364* (2013.01); *F16C 33/46* (2013.01); *F16C 33/6674* (2013.01); *F16C 33/4635* (2013.01)

(58) Field of Classification Search
CPC ............... F16C 33/366; F16C 33/4605; F16C 33/4617; F16C 33/4623; F16C 33/4635; F16C 33/4652
USPC .......................................... 384/571, 572, 576
See application file for complete search history.

(56) References Cited

U.S. PATENT DOCUMENTS

| 2,615,767 | A | * | 10/1952 | Wallgren ...................... 384/571 |
| 2005/0220383 | A1 | | 10/2005 | Yokota et al. |
| 2011/0069920 | A1 | | 3/2011 | Aida |
| 2015/0104126 | A1 | * | 4/2015 | Chudo et al. .................. 384/578 |

FOREIGN PATENT DOCUMENTS

| DE | 76 38 179 U1 | 6/1977 |
| JP | 2004-245231 A | 9/2004 |
| JP | 2005-069421 A | 3/2005 |
| JP | 2007-225037 A | 9/2007 |
| JP | 2008-202785 A | 9/2008 |

(Continued)

OTHER PUBLICATIONS

U.S. Appl. No. 14/570,410, filed Dec. 15, 2014 in the name of Okamoto et al.

(Continued)

*Primary Examiner* — Phillip A Johnson
(74) *Attorney, Agent, or Firm* — Oliff PLC

(57) ABSTRACT

A tapered roller bearing includes: an outer ring; an inner ring; a plurality of tapered rollers; and a cage that holds the tapered rollers at equal intervals in the circumferential direction of the tapered roller bearing. A small-diameter-side inner periphery end portion of the cage is located at a position inward of an axially outer small end face of the inner ring in the axial direction of the tapered roller bearing. A small-diameter-side end face of the cage has an inwardly tilted face that is tilted inward in the axial direction from the inner periphery end portion from the radially inner side to the radially outer side.

4 Claims, 12 Drawing Sheets

(56) References Cited

FOREIGN PATENT DOCUMENTS

| | | |
|---|---|---|
| JP | 2008-223863 A | 9/2008 |
| JP | 2010-007788 A | 1/2010 |
| JP | 2012-149744 A | 8/2012 |

OTHER PUBLICATIONS

U.S. Appl. No. 14/581,368, filed Dec. 23, 2014 in the name of Suzuki et al.

Jul. 8, 2015 Extended European Search Report issued in European Patent Application No. 14195990.5.

* cited by examiner

OUTWARD IN AXIAL DIRECTION

INWARD IN AXIAL DIRECTION

FIG.8
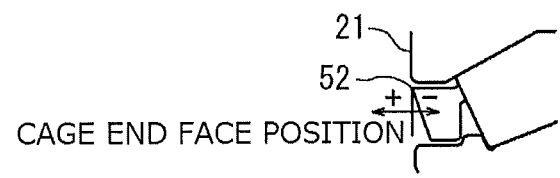
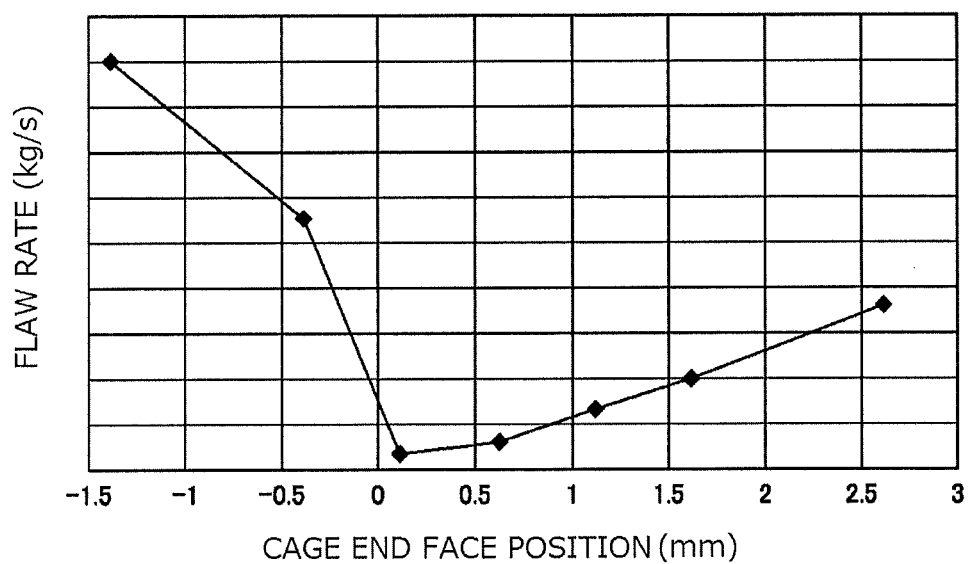

TAPERED ROLLER BEARING

INCORPORATION BY REFERENCE

The disclosure of Japanese Patent Application No. 2013-266844 filed on Dec. 25, 2013 and Japanese Patent Application No. 2014-060188 filed on Mar. 24, 2014, each including the specification, drawings and abstract, is incorporated herein by reference in its entirety.

BACKGROUND OF THE INVENTION

1. Field of the Invention

The invention relates generally to a tapered roller bearing, and more specifically to a tapered roller bearing incorporated in, for example, a final reduction gear unit of an automobile and lubricated with oil stored in the final reduction gear unit.

2. Description of the Related Art

FIG. 11 illustrates a conventional tapered roller bearing. The tapered roller bearing includes an outer ring 72, an inner ring 82, a plurality of tapered rollers 74, and a cage 87. The outer ring 72 has an outer raceway surface 71 formed on its inner peripheral face. The inner ring 82 has an inner raceway surface 81 formed on its outer peripheral face. The tapered rollers 74 are rollably disposed between the outer raceway surface 71 and the inner raceway surface 81. The cage 87 holds the tapered rollers 74 at equal intervals in the circumferential direction of the tapered roller bearing.

Tapered roller bearings are widely used because they are compact, able to bear large radial loads and large axial loads, and usable under high-speed rotation. However, toque loss of the tapered roller bearings is larger than that of ball bearings. Therefore, reduction of toque is a matter to be addressed from the viewpoint of energy saving.

The tapered roller bearing is configured such that, under the pumping action resulting from the rotation of the tapered roller bearing, the oil introduced into the tapered roller bearing through a clearance between a small-diameter-side end portion 88 of the cage 87 and an inner ring outer periphery 85 and a clearance between the small-diameter-side end portion 88 of the cage 87 and an outer ring inner periphery 75 flows through the tapered roller bearing. The stirring resistance of the oil largely contributes to an increase in the rotary torque of the tapered roller bearing. Japanese Patent Application Publication No. 2005-69421 (JP 2005-69421 A) describes a configuration in which a small-diameter-side portion of the cage 87 is bent radially inward to reduce a clearance between the small-diameter-side portion of the cage 87 and the outer periphery of the inner ring 82 (hereinafter, referred to as "radially-inner clearance") and to form a labyrinth, in order to appropriately adjust the flow of oil in the tapered roller bearing, thereby reducing the rotary torque. Japanese Patent Application Publication No. 2008-202785 (JP 2008-202785 A) describes a configuration in which means for adjusting a clearance between the small-diameter-side end portion 88 of the cage 87 and the inner periphery of the outer ring 72 (hereinafter, referred to as "radially-outer clearance") is provided in order to limit the flow of oil through the radially-outer clearance.

In the tapered roller bearing described in JP 2005-69421 A, the inner peripheral face of the small-diameter-side end portion 88 of the cage 87 faces the inner ring outer periphery 85 across a clearance in the radial direction of the tapered roller bearing. A cone front face rib (hereinafter, referred to as "a small rib") 89 that protrudes outward in the radial direction is formed on the inner ring outer periphery 85. The small-diameter-side end portion 88 of the cage 87 is disposed outward of the small rib 89 in the axial direction of the tapered roller bearing. An axially inner side face of the small-diameter-side end portion 88 faces an axially outer side face of the small rib 89 across a small clearance.

As described above, the labyrinth is formed between the inner peripheral side of the small-diameter-side end portion 88 of the cage 87 and the outer peripheral side of the inner ring 82. The labyrinth makes it possible to reduce the amount of oil flowing into the tapered roller bearing through the clearance located radially inward of the small-diameter-side end portion 88 of the cage 87. By reducing the amount of oil flowing into the tapered roller bearing, that is, into the inside of the tapered roller bearing in which the tapered rollers are disposed, through the radially-inner clearance as described above, it is possible to reduce stirring resistance of the oil, thereby curbing an increase in the rotary torque of the tapered roller bearing.

SUMMARY OF THE INVENTION

One object of the invention is to provide a tapered roller bearing configured to further restrict inflow of oil into the tapered roller bearing through a radially-inner clearance.

An aspect of the invention relates to a tapered roller bearing including: an outer ring having a tapered outer raceway surface formed on an inner peripheral face of the outer ring; an inner ring having a tapered inner raceway surface formed on an outer peripheral face of the inner ring; a plurality of tapered rollers rollably disposed between the outer raceway surface and the inner raceway surface; and a cage that holds the tapered rollers at equal intervals in a circumferential direction of the tapered roller bearing. A small-diameter-side inner periphery end portion of the cage is located at a position inward of an axially outer end face of the inner ring in an axial direction of the tapered roller bearing. A small-diameter-side end face of the cage has an inwardly tilted face that is tilted inward in the axial direction from the inner periphery end portion from a radially inner side to a radially outer side.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 8 is a graph illustrating the results of numerical analysis on the flow characteristics in the reference invention;

DETAILED DESCRIPTION OF THE PREFERRED EMBODIMENTS

Figure 1:
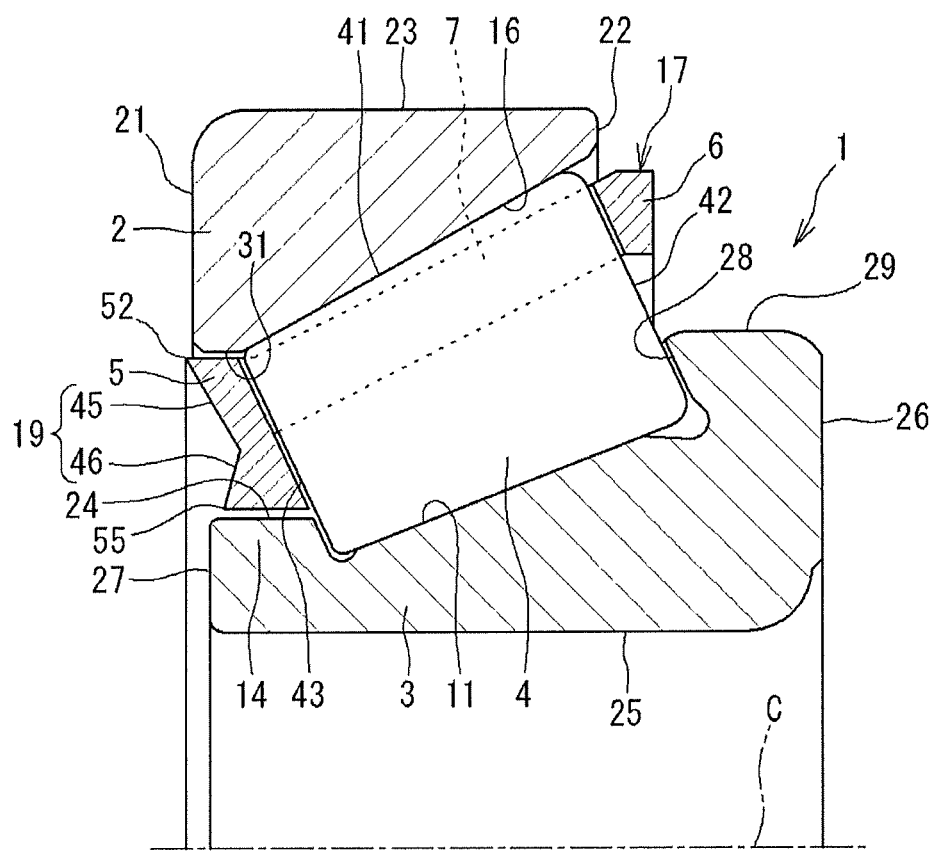
FIG. 1 is a sectional view illustrating a tapered roller bearing according to a first embodiment of the invention.

Hereinafter, an embodiment (first embodiment) of the invention will be described with reference to FIG. 1. A tapered roller bearing 1 illustrated in FIG. 1 is used, for example, to support a pinion shaft of a final reduction gear unit of an automobile. The tapered roller bearing 1 includes an outer ring 2, an inner ring 3, a plurality of tapered rollers 4, and an annular cage 17. The outer ring 2 has an outer raceway surface 16 formed on its inner periphery. The inner ring 3 has an inner raceway surface 11 formed on its outer periphery. The tapered rollers 4 are rollably disposed between the outer raceway surface 16 and the inner raceway surface 11. The cage 17 holds the tapered rollers 4 at equal intervals in the circumferential direction of the tapered roller bearing 1. In each embodiment described below, the outer ring 2, the inner ring 3, and the cage 17 have annular (short cylindrical) shapes that share an axis C as a center line.

The outer ring 2 has an outer peripheral face 23 formed in a cylindrical shape, and a large end face 21 and a small end face 22 that are located respectively at the opposite axial ends of the outer ring 2 and formed as flat faces perpendicular to the axis C. The outer raceway surface 16 is formed in a tapered shape, and a small-diameter-side thereof (left side in FIG. 1) is continuous with an inner periphery cylindrical face 31 that is formed centering around the axis C so as to extend parallel to the axis C. The outer ring 2 is made of bearing steel. After quench hardening is performed, the outer peripheral face 23, the large end face 21, the small end face 22, the outer raceway surface 16, and the inner periphery cylindrical face 31 are finished by grinding.

The inner ring 3 has an inner peripheral face 25 formed in a cylindrical shape, and a large end face 26 and a small end face 27 that are located respectively at the opposite axial ends of the inner ring 3 and formed as flat faces perpendicular to the axis C. The inner raceway surface 11 is formed in a tapered shape. On a large-diameter-side (right side in FIG. 1) of the inner raceway surface 11, a rib face 28 is formed so as to extend in a direction substantially perpendicular to the inner raceway surface 11 in a section taken along the axial direction of the tapered roller bearing 1 (section including the axis C). A cylindrical face 29 is formed between the radially outer side portion of the rib face 28 and the radially outer side portion of the large end face 26. At a small end face 27-side portion of the inner ring 3, a cone front face rib (hereinafter, referred to as "a small rib") 14 is formed so as to protrude from the small diameter side of the inner raceway surface 11 outward in the radial direction of the tapered roller bearing 1. A cylindrical face 24 centering around the axis C and extending parallel to the axis C is formed on the outer periphery of the small rib 14. The inner ring 3 is made of bearing steel. After quench hardening is performed, the inner peripheral face 25, the large end face 26, the small end face 27, the inner raceway surface 11, the rib face 28, and the cylindrical face 24 are finished by grinding.

Each tapered roller 4 has a generally circular truncated cone shape, and a rolling contact surface 41 located on the outer periphery thereof is formed into a tapered shape by grinding. The outer ring 2 and the inner ring 3 are coaxially assembled together such that the outer raceway surface 16 and the inner raceway surface 11 face each other in the radial direction. The tapered rollers 4 are rollably interposed between the outer raceway surface 16 and the inner raceway surface 11. Out of opposite end faces 42, 43 of each tapered roller 4, the large-diameter-side end face 42 is formed by grinding, and comes into sliding contact with the rib face 28 of the inner ring 3.

The cage 17 is manufactured by subjecting a synthetic resin such as polyphenyl sulfide or polyamide to injection molding. The cage 17 has a small-diameter annular portion 5, a large-diameter annular portion 6, and a plurality of cage bars 7 arranged at equal intervals in the circumferential direction of the cage 17. The small-diameter annular portion 5 and the large-diameter annular portion 6 are connected to each other by the cage bars 7. The longitudinal direction of each cage bar 7 substantially coincides with the direction of tilt of the outer raceway surface 16. One tapered roller 4 is disposed in a space between the cage bars 7 adjacent to each other. A space surrounded by the cage bars 7 adjacent to each other, the annular portion 5, and the annular portion 6 is referred to as a pocket. The inner walls of the pocket, which face each other in the circumferential direction, are close to the rolling contact surface 41 of the tapered roller 4, and the inner walls of the pocket, which face each other in the axial direction, are respectively close to the end faces 42, 43 of the tapered roller 4 in the axial direction. The cage 17 is positioned in the radial direction and the axial direction as the walls of pocket come into contact with the tapered roller 4. As described above, the cage 17 is positioned as the cage 17 comes into contact with the tapered rollers 4. However, certain amounts of clearances need to be left between the cage 17 and the tapered rollers 4 in order to allow the tapered rollers 4 to roll smoothly. Thus, a certain amount of clearance needs to be left between the cage 17 and each of the outer and inner rings 2, 3 to prevent contact between the cage 17 and the outer and inner rings 2, 3 during rotation of the tapered roller bearing 1. When the inner ring 3 rotates and thus the tapered rollers 4 make a revolving motion, the cage 17 makes a revolving motion under the guidance of the tapered rollers 4. Thus, the cage 17 rotates coaxially with the outer ring 2 and the inner ring 3.

The shape of the small-diameter-side annular portion 5 of the cage 17 will be described in detail with reference to FIG. 2. An outer periphery cylindrical face 51 is formed on the outer periphery of the annular portion 5. The outer periphery cylindrical face 51 is continuous with an outer peripheral face of each cage bar 7. The outer periphery cylindrical face 51 of the annular portion 5 is disposed coaxially with the inner periphery cylindrical face 31 formed on the inner periphery of the outer ring 2. The outer periphery cylindrical face 51 and the inner periphery cylindrical face 31 radially face each other across a prescribed clearance and a cylindrical space R parallel to the axis C is formed between the outer periphery cylindrical face 51 and the inner periphery cylindrical face 31.

An axially outer end face 19 of the annular portion 5 has, in its radially outer side region, an outwardly tilted face 45 tilted outward in the axial direction from the radially inner side toward the radially outer side. The outwardly tilted face 45 is a tapered face that meets the outer periphery cylindrical face 51 at an acute angle in a section taken along the axial direction (section including the axis C). Thus, the outer periphery end portion of the annular portion 5 is formed of a corner 52 at which the outwardly tilted face 45 and the outer periphery cylindrical face 51 meet each other at an acute angle. The cage 17 is incorporated into the tapered roller bearing 1 such that the axial position of the corner 52 at which the outwardly tilted face 45 and the outer periphery cylindrical face 51 meet each other substantially coincides with the axial position of the large end face 21 of the outer ring 2. The positional relationship between the outwardly tilted face 45 of the annular portion 5 and the outer ring 2 will be described below in detail.

The axially outer end face 19 of the annular portion 5 has, in its radially inner side region, an inwardly tilted face 46 tilted inward in the axial direction from the radially inner side toward the radially outer side. The inwardly tilted face 46 is a tapered face that meets a cylindrical inner peripheral face 53 at an acute angle in a section taken along the axial direction (section including the axis C). Thus, the inner periphery end portion of the annular portion 5 is formed of a corner 55 at which the inwardly tilted face 46 and the inner peripheral face 53 meet each other at an acute angle. The inner periphery end portion of the annular portion 5, that is, the corner 55 is disposed at a position located axially inward of the small end face 27 of the inner ring 3 in the axial direction. Further, the corner 55 is located near the cylindrical face 24 of the outer peripheral face of the inner ring 3 in the radial direction.

As described above, the axially outer end face 19 of the annular portion 5 has, in its radially inner side region, the inwardly tilted face 46. The inwardly tilted face 46 is tilted from the inner periphery end portion of the annular portion 5 (corner 55) inward in the axial direction from the radially inner side toward the radially outer side. The inwardly tilted face 46 is formed of a tilted face starting from the corner 55. The axially outer end face 19 has, in its radially outer side region, the outwardly tilted face 45 that is continuous with the inwardly tilted face 46 and that forms an angle of 90° or more with the inwardly tilted face 46. The outwardly tilted face 45 is formed of a tilted face ending at the corner 52.

The positional relationship between the inwardly tilted face 46 and the corner 55 of the annular portion 5, and the inner ring 3 will be described below. As described above, the corner 55 is located axially inward of the small end face 27 of the inner ring 3. For example, the distance from the small end face 27 to the tip (edge) of the corner 55 in the axial direction (hereinafter, referred to as "axial distance") is preferably equal to or longer than zero mm and equal to or shorter than one mm. The axial distance is zero mm when the axial position of the small end face 27 and the axial position of the tip of the corner 55 coincide with each other. The tip of the corner 55 is disposed close to the cylindrical face 24 of the inner ring 3. The distance from the cylindrical face 24 to the tip of the corner 55 in the radial direction is preferably equal to or longer than 0.1 mm and equal to or shorter than one mm. The results of numerical analysis on the positional relationship in the axial direction between the cage 17 having the corner 55 and the inner ring 3 and the tilt angle of the inwardly tilted face 46 tilted inward in the axial direction will be described later. As described above, the corner 55 is close to an intersection 62 at which the small end face 27 and the cylindrical face 24 of the inner ring 3 meet each other. In the present embodiment, a rounded face is formed at the intersection 62. A virtual extension line obliquely extending radially inward from the inwardly tilted face 46 may intersect with the rounded face of the intersection 62 in a section illustrated in FIG. 2.

An inner peripheral face 53 of the annular portion 5 is formed in a cylindrical face centering around the axis C of the cage 17 and extending parallel to the axis C. The inner peripheral face 53 is disposed coaxially with the cylindrical face 24 of the inner ring 3. The cage 17 is incorporated into the tapered roller bearing 1 such that the inner peripheral face 53 and the cylindrical face 24 radially face each other across a prescribed clearance. An axially inner side face 54 of the annular portion 5 is a flat face, and the radially outer side portion of the side face 54 is continuous with the inner peripheral face of each cage bar 7.

As described above, when the cage 17 is incorporated in the tapered roller bearing 1, the annular portion 5, which is the small-diameter-side portion, is disposed radially outward of the small rib 14 of the inner ring 3, and the inner peripheral face 53 of the annular portion 5 and the cylindrical face 24 of the inner ring 3 face each other across a small clearance. In this way, a labyrinth is formed between the inner peripheral side of the annular portion 5 and the outer peripheral side of the inner ring 3.

Next, the flows of oil during rotation of the inner ring 3 will be described with reference to FIG. 2. In the following description, with regard to the tapered roller bearing 1, the side on which the small end face 27 of the inner ring 3 is located will be referred to as "small diameter side", and the side on which the large end face 26 of the inner ring 3 is located will be referred to as "large diameter side". In the final reduction gear unit of the automobile in which the tapered roller bearing 1 is used, the oil stored in a differential case is thrown up due to the rotation of the gear and thus a large amount of oil is supplied to the tapered roller bearing 1 that supports the pinion shaft.

During the rotation of the inner ring 3, the oil in the bearing (more specifically, the oil present between the tapered rollers 4 adjacent to each other) is moved radially outward toward the outer raceway surface 16 by a centrifugal force. Due to the tapered shape of the outer raceway surface 16, the oil moves along the outer raceway surface 16 toward the large diameter side. As described above, in the tapered roller bearing 1, so-called pumping action is generated, so that the oil flows through the tapered roller bearing 1 from the small diameter side to the large diameter side.

When the amount of oil that flows through the tapered roller bearing 1 is too large, the rotary torque increases due to stirring resistance generated as the tapered rollers 4 stir the oil, so that power loss of a device (in this case, the final reduction gear unit) provided with the tapered roller bearing 1 increases. On the other hand, when the amount of oil that flows through the tapered roller bearing 1 is too small, it is not possible to sufficiently lubricate a sliding contact region where the tapered rollers 4 and the outer ring 2 or the inner ring 3 are brought into sliding contact with each other. This may cause, for example, seizure.

Under the pumping action, the oil flows into the tapered roller bearing 1 through an opening between the outer ring 2 and the inner ring 3, which is located on the small diameter side of the tapered roller bearing 1. As illustrated in FIG. 2, the small-diameter-side annular portion 5 of the cage 17 is located in the opening. Therefore, in order to reduce the amount of oil that flows through the tapered roller bearing 1, it is necessary to reduce both the amount of oil flowing into the tapered roller bearing 1 from the outer peripheral side of the annular portion 5 and the amount of oil flowing into the tapered roller bearing 1 from the inner peripheral side of the annular portion 5.

The inflow of oil from the inner peripheral side of the annular portion 5 will be described below. As described above, the labyrinth is formed between the inner peripheral side of the annular portion 5 and the outer periphery of the inner ring 3. Therefore, even if the dimensional accuracy of the cage 17 is not strictly set, it is possible to reduce the amount of oil flowing into the tapered roller bearing 1 from the inner peripheral side of the annular portion 5 as long as the clearance between the annular portion 5 and the inner ring 3 is within a certain range.

Figure 10:
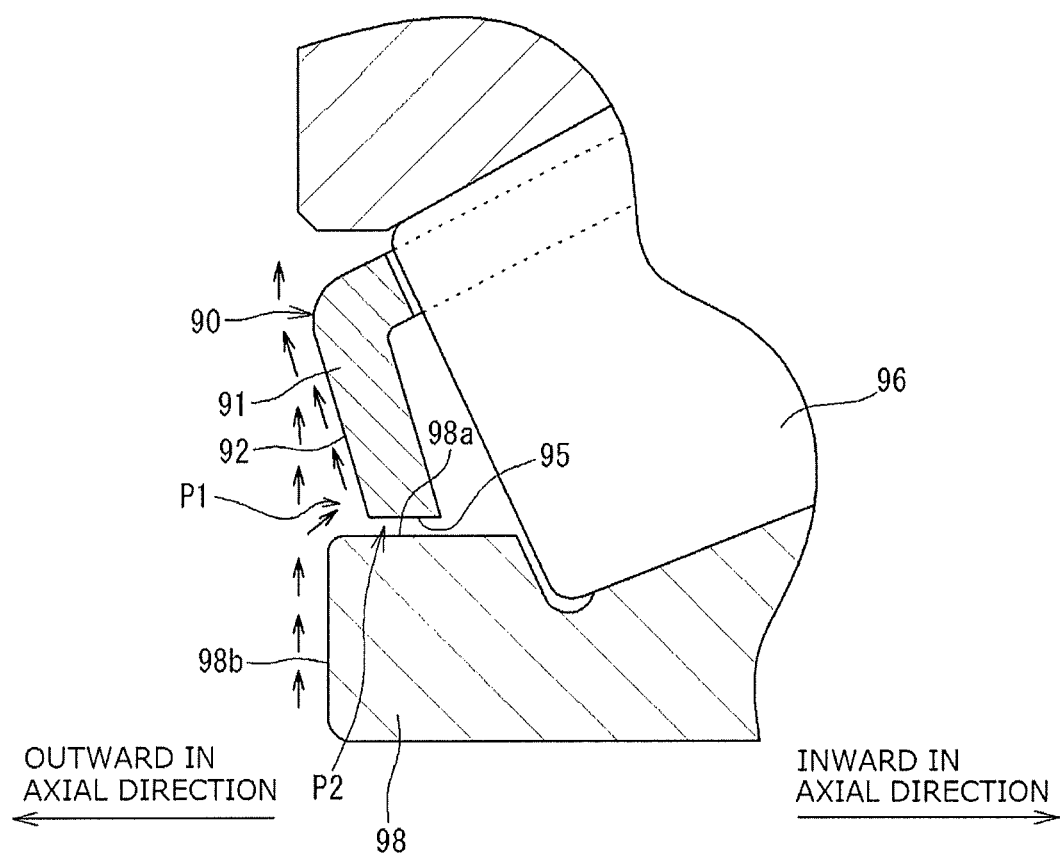
FIG. 10 is an explanatory view of a small-diameter-side annular portion of a conventional cage.
Figure 11:
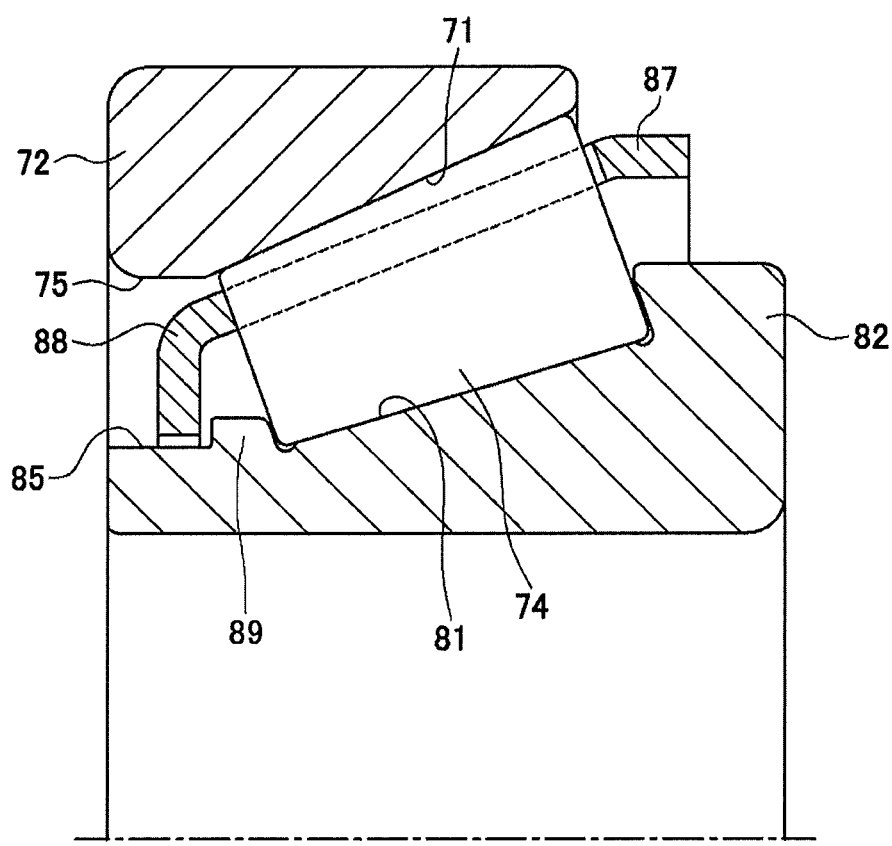
FIG. 11 is a sectional view of a conventional tapered roller bearing.

The tapered roller bearing 1 according to the present embodiment has the following function in addition to the function of the labyrinth in order to restrict the inflow (reduce the flow rate) of oil from the inner peripheral side of the annular portion 5. Before the function is described, a conventional configuration will be described with reference to FIG. 10. FIG. 10 is an explanatory view illustrating a small-diameter side annular portion 91 of a conventional cage 90. An inner peripheral face 95 of the annular portion 91 is a cylindrical face that faces an outer peripheral face 98a of an inner ring 98. An axially outer end face 92 of the annular portion 91 is a tilted face tilted axially outward from the radially inner side to the radially outer side. Thus, with the rotation of the inner ring 98, oil having a velocity component directed outward in the radial direction flows along a small end face 98b of the inner ring 98 due to a centrifugal force. After the oil departs from the small end face 98b, part of the oil flows inward in the axial direction and collides with a radially inner side portion of the end face 92, so that the flow of oil is hindered. Thus, the pressure becomes relatively high in a region P1 in which part of the oil collides with the end face 92. Thus, in the region P1, the pressure is higher than that in a cylindrical space P2 formed between the inner peripheral face 95 of the annular portion 91 and the outer peripheral face 98a of the inner ring 98, so that a flow of oil from the region P1 toward the cylindrical space P2 is generated. As a result, the oil easily enters the inside of the bearing (inside in the axial direction) where tapered rollers 96 are disposed.

Figure 2:
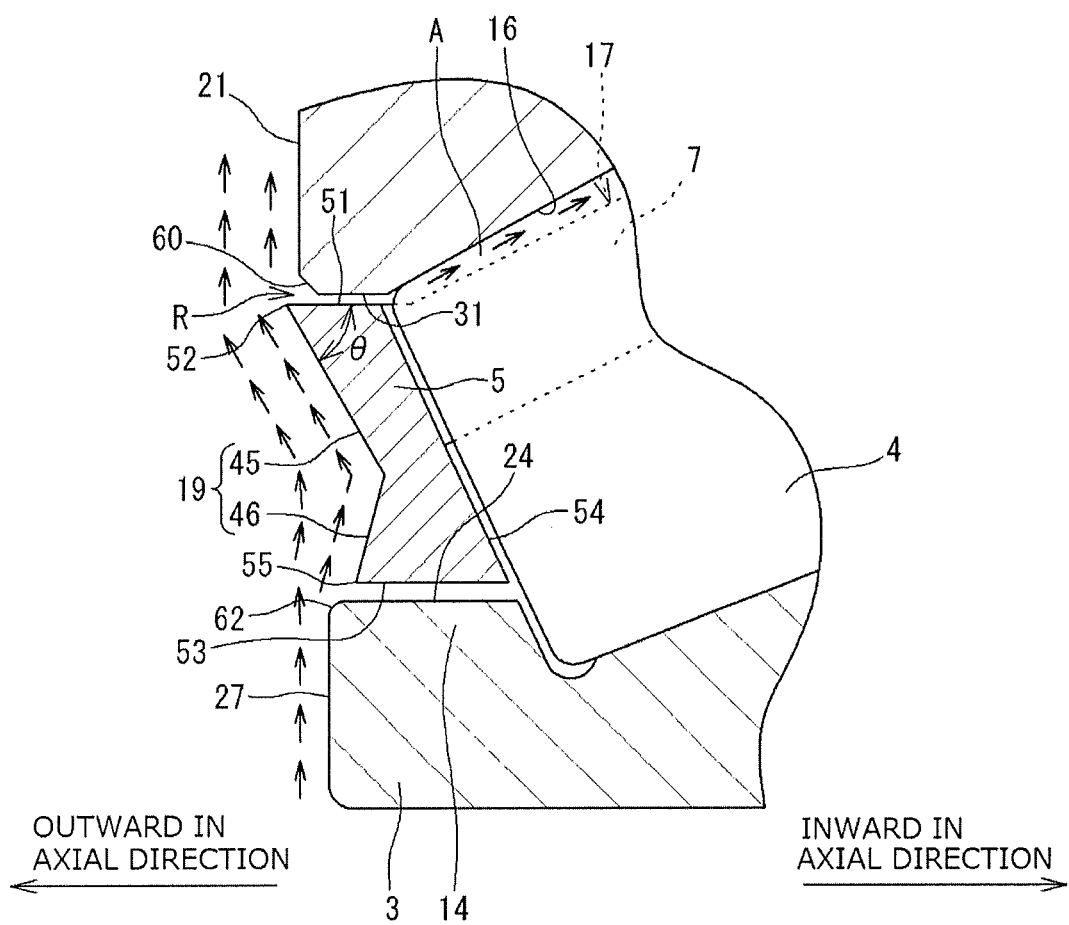
FIG. 2 is an enlarged view of main portions of the tapered roller bearing in the first embodiment illustrated in FIG. 1.

Thus, in the present embodiment illustrated in FIG. 2, in order to restrict the inflow (reduce the flow rate) of oil from the inner peripheral side of the annular portion 5, the tip of the corner 55, which is the inner periphery end portion of the annular portion 5, is located axially inward of the small end face 27 of the inner ring 3 and close to the cylindrical face 24 of the inner ring 3. Further, the axially outer end face 19 of the annular portion 5 has, in its radially inner side region, the inwardly tilted face 46 tilted from the corner 55 inward in the axial direction from the radially inner side toward the radially outer side.

Thus, with the rotation of the inner ring 3, the oil having a velocity component directed outward in the radial direction flows along the small end face 27 of the inner ring 3 due to a centrifugal force. After the oil departs from the small end face 27, part of the oil flows inward in the axial direction. However, in the configuration according to the present embodiment illustrated in FIG. 2, the axial position of the tip of the corner 55 of the inner periphery end portion of the annular portion 5 coincides with the axial position of the small end face 27 of the inner ring 3 or located axially inward of the axial position of the small end face 27, and, further, the axially outer end face 19 has the inwardly tilted face 46 tilted inward in the axial direction starting from the corner 55. This configuration enables part of the oil to flow along the inwardly tilted face 46 and to be guided toward the radially outer side. That is, this configuration makes it possible to adjust the flow of oil. Thus, the flow of oil is less likely to be hindered by the annular portion 5. As described above, in the conventional configuration illustrated in FIG. 10, the flow of oil is hindered by the annular portion 91, so that the pressure in the region P1 increases. The oil in the region P1 in which the pressure has increased easily flows into the tapered roller bearing 1 through the cylindrical space P2 in which the pressure is relatively low. On the other hand, in the present embodiment illustrated in FIG. 2, the flow of oil is less likely to be hindered by the annular portion 5, and thus an increase in the pressure is restricted unlike in the conventional configuration. As a result, it is possible to restrict generation of the flow of oil into the tapered roller bearing, which occurs in the conventional configuration. In other words, it is possible to restrict the inflow (reduce the flow rate) of oil from the inner peripheral side of the annular portion 5.

Figure 9:
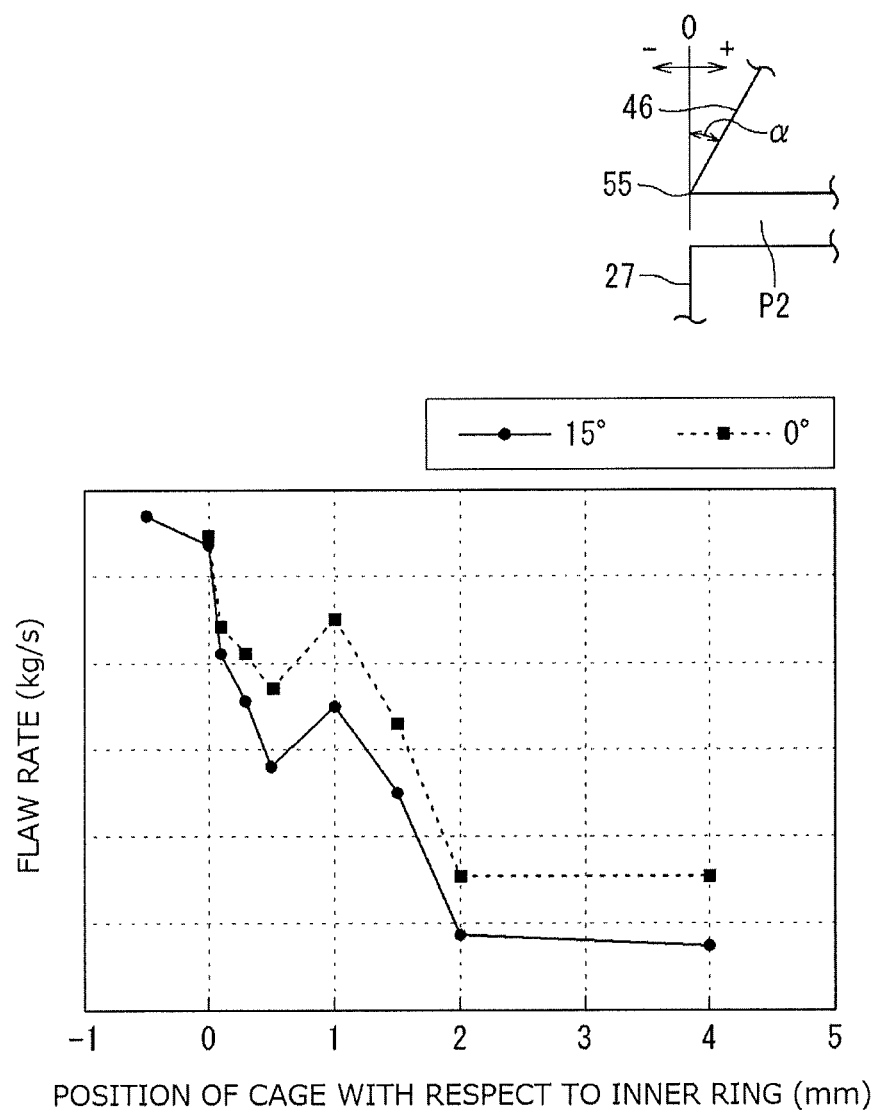
FIG. 9 is a graph illustrating the results of numerical analysis on the flow characteristics in a radially-inner clearance.

The positional relationship in the axial direction between the tip of the corner 55 of the cage 17 and the small end face 27 of the inner ring 3, and the tilt angle of the inwardly tilted face 46 will be described with reference to FIG. 9. FIG. 9 is a graph illustrating the results of numerical analysis on the flow rate characteristics of the oil in the cylindrical space P2 (radially-inner clearance) formed between the annular portion 5 of the cage 17 and the inner ring 3. FIG. 9 illustrates the results of numerical analysis that was performed while changing the axial position of the tip of the corner 55 with respect to the small end face 27 of the inner ring 3. The abscissa axis in FIG. 9 represents the axial position of the tip of the corner 55 with respect to the small end face 27 of the inner ring 3. Specifically, zero in the graph indicates the position at which the axial position of the small end face 27 and the axial position of the tip of the corner 55 coincide with each other, and the direction in which the position of the tip of the corner 55 is offset further inward (rightward in the schematic diagram in FIG. 10) in the axial direction from the small end face 27 is defined as a positive (+) direction. The ordinate axis in FIG. 9 represents the amount of oil (flow rate) flowing through the cylindrical space P2.

A continuous line in the graph in FIG. 9 indicates the result of analysis on the configuration where a tilt angle α of the inwardly tilted face 46 (refer to the schematic diagram in FIG. 9) is 15°. On the other hand, a dashed line in the graph in FIG. 9 indicates the result of analysis on the configuration where a tilt angle α is 0°, which is a conventional configuration. The numerical analysis was made under the conditions that the rotational speed of the inner ring 3 is 5000 rpm, the temperature of the oil is 80° C., and the size of the cylindrical space P2 in the radial direction is 0.5 mm, and the conditions that the outer ring 2 is fixed and the cage 17 makes a revolving motion under the guidance of the tapered rollers 4 in response to the rotation of the inner ring 3.

As is apparent from FIG. 9, because the inwardly tilted face 46 is tilted (α=15°), the flow rate of the oil flowing through the cylindrical space P2 is reduced. In other words, it was confirmed that because the inwardly tilted face 46 is tilted, the flow of oil along the inwardly tilted face 46 is facilitated and the inflow of oil toward the cylindrical space P2 is restricted.

It was confirmed that because the tip of the corner 55 is offset from the small end face 27 in the axial direction, the flow rate of oil flowing through the cylindrical space P2 is reduced. Specifically, the axial position of the corner 55 is offset from the small end face 27 in the axial direction preferably by an amount within a range of zero mm to one mm for the following reason. As the oil flowing along the small end face 27 departs from the outer periphery end portion of the small end face 27, a negative pressure region is formed on the back side of the flow. However, when the axial position of the tip of the corner 55 is relatively close to the small end face 27, that is, the axial position of the tip of the corner 55 is offset from the small end face 27 by an amount within the range of zero mm to one mm, the negative pressure region is formed at an inlet (left side portion in the schematic diagram in FIG. 9) of the cylindrical space P2. As a result, in the cylindrical space P2, a flow from a center portion (right side in the schematic diagram in FIG. 9) where the pressure is relatively high toward the inlet (negative pressure region) where the pressure is low is generated. Thus, entry of the oil from the outside in the axial direction into the cylindrical space P2 is effectively restricted. As the tip of the corner 55 is further offset from the small end face 27 in the axial direction, the oil flowing along the small end face 27 is less likely to reach the cylindrical space P2. As a result, the flow rate of oil flowing through the cylindrical space P2 is reduced.

Therefore, preferably, the inwardly tilted face 46 is tilted inward in the axial direction from the radially inner side to the radially outer side, and the tip of the corner 55 is located at a position offset from the small end face 27 by an amount within the range from zero mm to one mm. An angle α formed between a line perpendicular to the axis C and the inwardly tilted face 46 in a section taken along the axial direction (refer to the schematic diagram in FIG. 9) is preferably within a range of 10° to 30°. When the angle α is within the range of 10° to 30°, the flow rate of oil is significantly reduced.

Next, the inflow of oil from the outer peripheral side of the annular portion 5 will be described. In the tapered roller bearing 1, the oil present in a clearance between the cage bars 7 of the cage 17 and the outer raceway surface 16 (hereinafter, referred to as "clearance A") flows from the small diameter side toward the large diameter side due to a centrifugal force. Therefore, in the related art, the oil present between the cage 17 and the outer ring 2, at a position at the small-diameter-side end portion of the cage 17, is drawn by the flow of oil in the clearance A and thus guided to the clearance A. As a result, it is not possible to sufficiently reduce the amount of oil that flows through the tapered roller bearing 1.

Therefore, in the present embodiment, the outer periphery cylindrical face 51 extending parallel to the axis C is formed on the outer periphery of the annular portion 5, at a position at the small-diameter-side end portion of the cage 17, and the cylindrical space R is formed between the outer periphery cylindrical face 51 and the inner periphery cylindrical face 31 extending parallel to the axis C. The cylindrical space R is defined by the inner periphery cylindrical face 31 that is a cylindrical face defined by a generating line parallel to the axis C. As a result, even when a centrifugal force is applied to the oil in the cylindrical space R, the oil does not flow actively from the small diameter side to the large diameter side unlike in the case of a tilted face. The size of the cylindrical space R in the radial direction (radially-outer clearance) is small. In other words, the distance between the outer periphery cylindrical face 51 of the annular portion 5 and the inner periphery cylindrical face 31 of the outer ring 2 is short. The distance is set to a value, for example, equal to or longer than 0.1 mm and equal to or shorter than 1.5 mm.

In addition, in the present embodiment, the outwardly tilted face 45 of the end face 19 of the cage 17 tilts outward in the axial direction from the radially inner side toward the radially outer side, and the axial position of the tip of the corner 52 substantially coincides with the axial position of the large end face 21 of the outer ring 2. Thus, when the oil thrown up onto the end face 19 of the annular portion 5 due to the rotation of the gear or the oil that has flowed along the inwardly tilted face 46 and the outwardly tilted face 45 of the end face 19 of the annular portion 5 is splashed outward from the corner 52 by a centrifugal force, the direction in which the oil is scattered is a direction away from the large end face 21 of the outer ring 2. In this way, the oil is prevented from flowing into the cylindrical space R.

The flow of oil flowing radially outward along the end face 19 departs from the end face 19 at the corner 52, so that a region in which the pressure is low (low pressure region) is formed on the back side of the corner 52 (right side of corner 52, in FIG. 2). The axial position of the corner 52 substantially coincides with the axial position of the large end face 21 of the outer ring 2. Therefore, the low pressure region is formed at the large end face 21-side opening of the cylindrical space R.

The oil flows toward the low pressure side, and thus the oil present in the cylindrical space R flows from the inside of the tapered roller bearing 1 toward the large end face 21. This reduces the amount of oil drawn from the cylindrical space R toward the clearance A. As a result, the inflow of oil from the outer peripheral side of the annular portion 5 is reduced.

As described above, in the embodiment illustrated in FIG. 2, the axial position of the tip of the corner 52 of the annular portion 5 located on the small diameter side is set to a position that substantially coincides with the axial position of the large end face 21 of the outer ring 2. The concrete examples of the "position that substantially coincides with the axial position of the large end face 21" will be described below. As the "position that substantially coincides with the axial position of the large end face 21", in addition to the axial position of the tip of the corner 52, which completely coincides with the axial position of the large end face 21, a position where the distance by which the tip of the corner 52 is offset outward from the large end face 21 in the axial direction (hereinafter, referred to as "offset distance") is equal to or shorter than one mm is the optimum position, as in the case illustrated in FIG. 8, which will be described in association with the later-described reference invention. The distance by which the tip of the corner 52 is offset outward from the large end face 21 in the axial direction may be longer than one mm, and may be equal to or shorter than 2.6 mm as in the case illustrated in FIG. 8. That is, the examples of the "position that substantially coincides with the axial position of the large end face 21" include a position at which the offset distance is equal to or shorter than 2.6 mm.

As can be understood from the above description, in the tapered roller bearing 1 according to the present embodiment, the amount of oil flowing into the tapered roller bearing 1 is restricted by filling the clearance, through which the oil flows, with the oil low pressure region, on the outer peripheral side of the cage 17. This makes it possible to reduce the amount of oil flowing through the tapered roller bearing 1 from the small diameter side to the large diameter side without strictly controlling the dimensional accuracy of the cage 17. As a result, it is possible to provide the tapered roller bearing 1 in which the stirring resistance of the oil is lowered and thus the rotary torque during rotation is reduced. Preferably, the angle θ formed between the outwardly tilted face 45 and the axis C is within a range of 45° to 75° in a section taken along the axial direction. In this case, the effect of reducing the flow rate is significant.

In the embodiment illustrated in FIG. 1 and FIG. 2, the axially outer end face 19 of the annular portion 5 has the inwardly tilted face 46 tilted inward in the axial direction from the corner 55 of the inner periphery end portion from the radially inner side to the radially outer side, and the outwardly tilted face 45 that is tilted outward in the axial direction and that is tilted in a direction different from the direction in which the inwardly tilted face 46 is tilted. This configuration prevents an increase in the size of the annular portion 5 of the cage 17, which is located on the small diameter side, in the axial direction. As a result, it is possible to prevent an increase in the size of the tapered roller bearing 1 in the axial direction. If the radially outer side region of the axially outer end face 19 of the annular portion 5 is an "annular face" that is orthogonal to the axis C instead of the outwardly tilted face 45, when the axial position of the outer peripheral side corner 52 of the annular portion 5 substantially coincides with the axial position of the large end face 21 of the outer ring 2 and the "annular face" and the inwardly tilted face 46 are connected to each other, the inner peripheral side corner 55 of the annular portion 5 needs to be located at a position axially outward of that in the present embodiment. As a result, a sectional shape of the annular portion 5 is enlarged in the axial direction from the radially outer side to the radially inner side. When the small end face 27 of the inner ring 3 is located axially outward of the corner 55 as in the present embodiment, the position of the small end face 27 of the inner ring 3 is offset from the large end face 21 of the outer ring 2 in the axial direction by a large amount. As a result, the size of the tapered roller bearing in the axial direction increases. However, in the present embodiment, as described above, the axially outer end face 19 of the annular portion 5 has the inwardly tilted face 46 and the outwardly tilted face 45 that differs in the tilting direction. Thus, the axial position of the small end face 27 of the inner ring 3 and the axial position of the large end face 21 of the outer ring 2 substantially coincide with each other. This makes it possible to prevent an increase in the size of the tapered roller bearing 1 in the axial direction.

Figure 3:
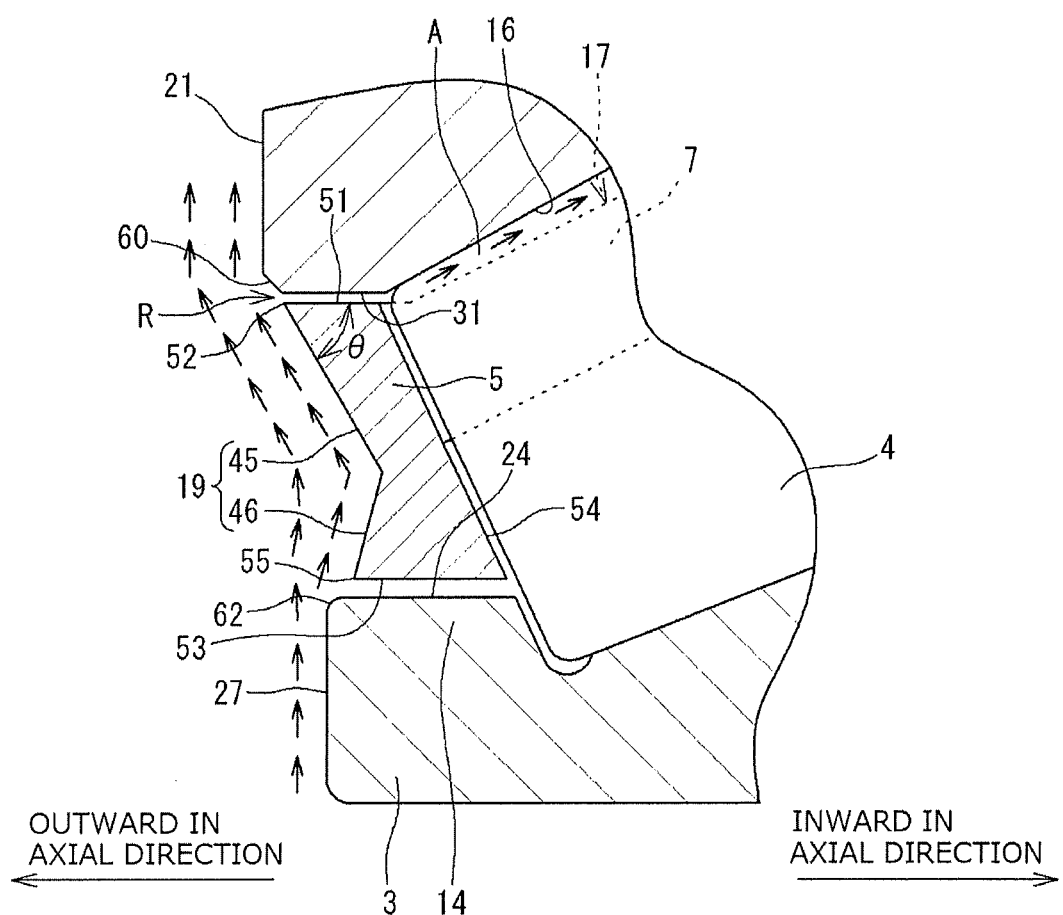
FIG. 3 is a sectional view illustrating a tapered roller bearing according to another embodiment of the invention.

In the tapered roller bearing 1 according to the invention, the axial position of the tip of the corner 52 needs to substantially coincide with the axial position of the large end face 21 of the outer ring 2. As illustrated in FIG. 3, the examples of the "position that substantially coincides with the axial position of the large end face 21" include a position at which the tip of the corner 52 is slightly offset inward from the large end face 21 of the outer ring 2 in the axial direction (slightly offset from the large end face 21 of the outer ring 2 in a direction toward the inside of the tapered roller bearing 1, in which the tapered rollers 4 are disposed). In other words, the direction in which the position of the end face of the cage 17 is offset from the large end face 21 of the outer ring 2 may be a negative (−) direction. Examples of the "position that substantially coincides with the axial position of the large end face 21" when the position of the end face of the cage 17 is offset from the large end face 21 in the negative direction include a position at which the offset distance is within a range from −0.4 mm to zero mm (a position at which the absolute value of the offset distance is equal to or smaller than four mm and larger than zero mm). In this case as well, it is possible to restrict the inflow of oil into the tapered roller bearing 1 from the outer peripheral side of the annular portion 5 (refer to FIG. 8 which will be described in association with the reference invention). In other words, the examples of the "position that substantially coincides with the axial position of the large end face 21" include a position at which the offset distance is within the range from −0.4 mm to zero mm.

Figure 4:
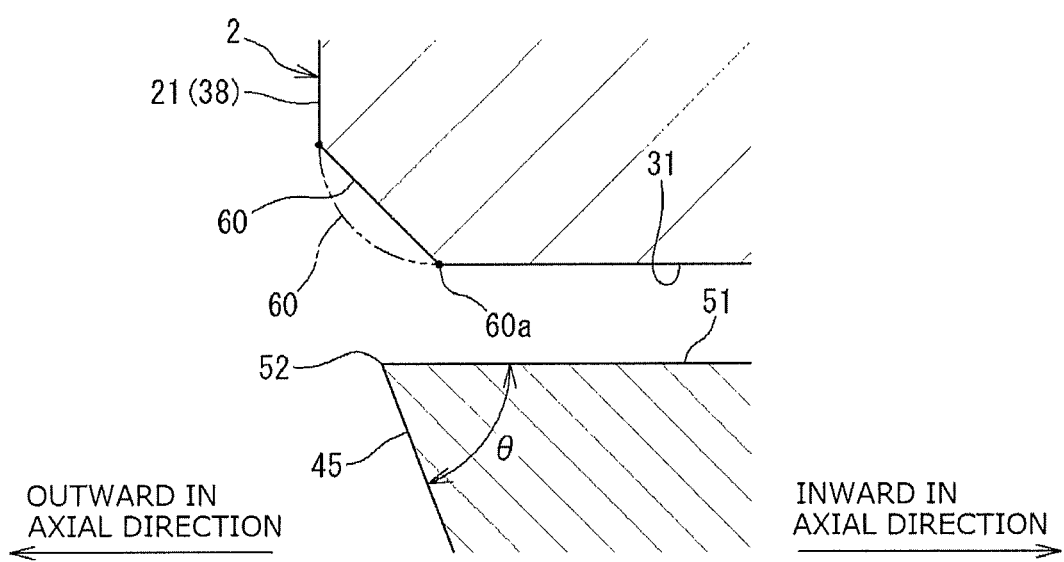
FIG. 4 is an explanatory view illustrating the configuration where a chamfer is formed between a large end face and an inner periphery cylindrical face of an outer ring.

FIG. 4 illustrates a configuration where a chamfer 60 is formed between the large end face 21 and the inner periphery cylindrical face 31 of the outer ring 2 and the tip of the corner 52 is located axially outward of a starting point 60a of the rounded face 60, which is located on the inner periphery cylindrical face 31 side. This configuration may be included in the examples of the configuration where the axial position of the tip of the corner 52 substantially coincides with the axial position of the large end face 21 of the outer ring 2. In other words, the configuration where the tip of the corner 52 is located within an axial range from the large end face 21 to the starting point 60a of the rounded face 60 is included in the examples of the configuration where "the axial position of the tip of the corner 52 substantially coincides with the axial position of the large end face 21 of the outer ring 2". FIG. 4 illustrates the configuration where a rounded face 60 is formed as indicated by a long dashed double-short dashed line in place of the chamfer 60 and the tip of the corner 52 is located axially outward of a starting point 60a of the rounded face 60, which is located on the inner periphery cylindrical face 31 side. This configuration may be included in the examples of the configuration where the axial position of the tip of the corner 52 substantially coincides with the axial position of the large end face 21 of the outer ring 2. The size of the chamfer 60 (the radius of the rounded face 60) is equal to or shorter than 0.5 mm.

Figure 5:
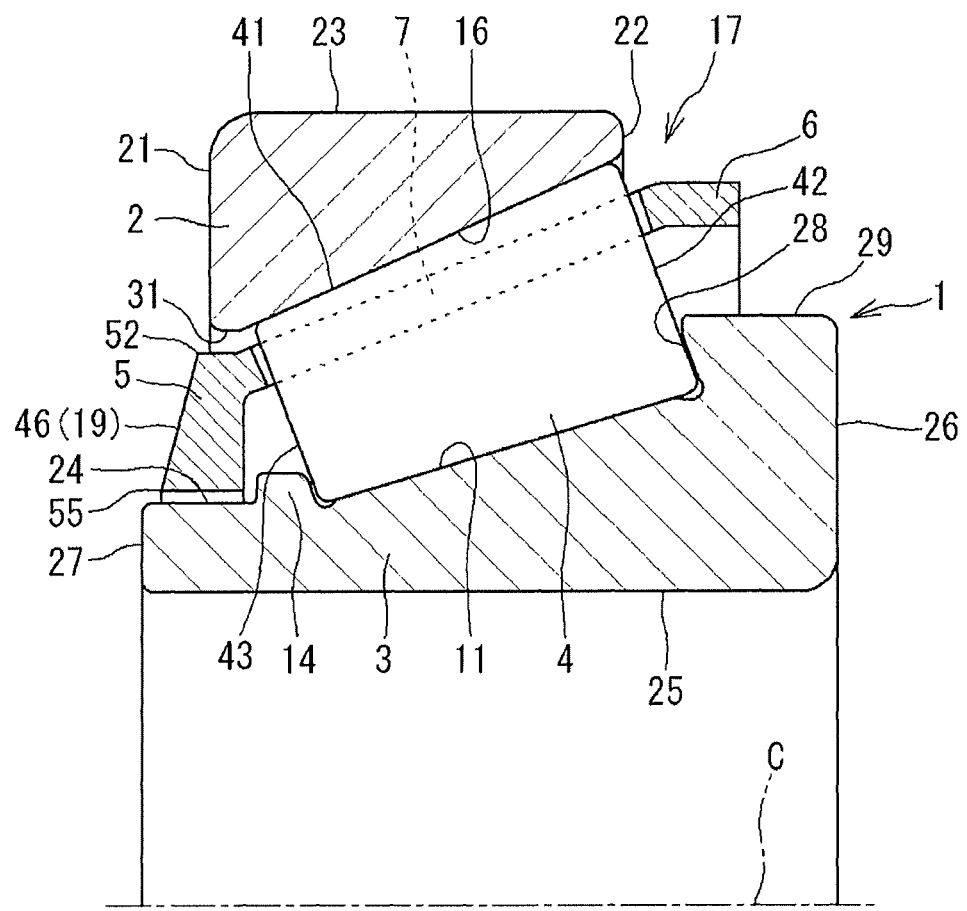
FIG. 5 is a sectional view illustrating a tapered roller bearing according to another embodiment of the invention.

FIG. 5 is a sectional view illustrating a tapered roller bearing 1 according to another embodiment of the invention. The tapered roller bearing 1 illustrated in FIG. 5 is the same as the tapered roller bearing 1 illustrated in FIG. 1 except for the shapes of a cage 17 and an inner ring 3. A cylindrical face 24 centering around the axis C and extending parallel to the axis C is formed on the outer periphery of a small end face 27-side portion of the inner ring 3. A small rib 14 having an outer diameter slightly larger than the outer diameter of the cylindrical face 24 is formed between the cylindrical face 24 and an inner raceway surface 11. A labyrinth is formed between the inner peripheral side of the small-diameter-side annular portion 5 of the cage 17 and the outer peripheral side of the inner ring 3.

An axially outer end face 19 of the small-diameter side annular portion 5 of the cage 17 is formed only of an inwardly tilted face 46 tilted inward in the axial direction from the radially inner side to the radially outer side. In other words, the end face 19 does not have an outwardly tilted face 45 illustrated in FIG. 1. In the embodiment illustrated in FIG. 5, the tip of the outer periphery end portion (corner 52) of the annular portion 5 is offset outward in the axial direction from a large end face 21 of an outer ring 2.

The inflow of oil from the inner peripheral side of the annular portion 5 in the embodiment illustrated in FIG. 5 will be described below. As described above, the labyrinth is formed between the inner peripheral side of the annular portion 5 and the outer periphery of the inner ring 3. Therefore, it is possible to reduce the amount of oil flowing into the tapered roller bearing 1 from the inner peripheral side of the annular portion 5. The tapered roller bearing 1 according to the present embodiment has the function as described in the embodiment illustrated in FIG. 1 and FIG. 2 in addition to the function of the labyrinth in order to restrict the inflow (reduce the flow rate) of oil from the inner peripheral side of the annular portion 5.

That is, in the embodiment illustrated in FIG. 5, in order to restrict the inflow (reduce the flow rate) of oil from the inner peripheral side of the annular portion 5, the tip of a corner 55 of the inner periphery end portion of the annular portion 5 is located at a position axially inward of the small end face 27 of the inner ring 3 and close to the cylindrical face 24 of the inner ring 3. Further, the axially outer end face 19 of the annular portion 5 has the inwardly tilted face 46 tilted inward in the axial direction from the corner 55 from the radially inner side to the radially outer side.

Thus, with the rotation of the inner ring 3, the oil having a velocity component directed outward in the radial direction flows along the small end face 27 of the inner ring 3 due to a centrifugal force. After the oil departs from the small end face 27, part of the oil flows inward in the axial direction. However, in the configuration according to the present embodiment, the axial position of the tip of the corner 55 of the inner periphery end portion of the annular portion 5 coincides with the axial position of the small end face 27 of the inner ring 3 or located axially inward of the axial position of the small end face 27, and, further, the axially outer end face 19 has the inwardly tilted face 46 tilted inward in the axial direction starting from the corner 55. This configuration enables the part of the oil to flow along the inwardly tilted face 46 and to be guided toward the radially outer side. That is, this configuration makes it possible to adjust the flow of oil. Thus, the flow of oil is less likely to be hindered by the annular portion 5. As a result, it is possible to prevent an increase in the pressure in the region radially inward of the annular portion 5, unlike in the conventional configuration illustrated in FIG. 10. Thus, it is possible to restrict generation of the flow of oil into the tapered roller bearing 1. In other words, it is possible to restrict the inflow (reduce the flow rate) of oil from the inner peripheral side of the annular portion 5. As a result, it is possible to provide the tapered roller bearing 1 in which the stirring resistance of the oil is lowered and thus the rotary torque during rotation is reduced.

Figure 6:
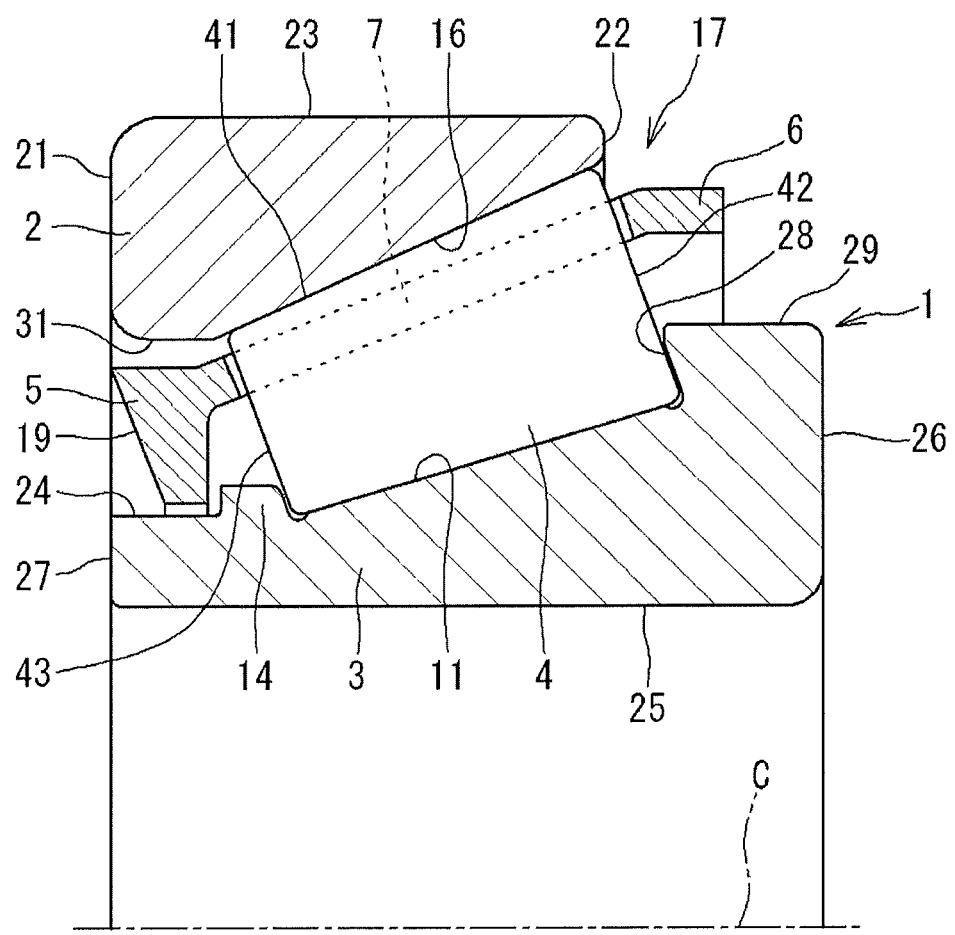
FIG. 6 is a sectional view illustrating a tapered roller bearing according to a reference invention.

Hereinafter, a reference invention will be described with reference to FIG. 6 to FIG. 8. A tapered roller bearing 1 illustrated in FIG. 1 is used, for example, to support a pinion shaft of a final reduction gear unit of an automobile. The tapered roller bearing 1 includes an outer ring 2, an inner ring 3, a plurality of tapered rollers 4, and a cage 17. The outer ring 2 has a tapered outer raceway surface 16 formed on its inner periphery. The inner ring 3 has a tapered inner raceway surface 11 formed on its outer periphery. The tapered rollers 4 are rollably disposed between the outer raceway surface 16 and the inner raceway surface 11. The cage 17 holds the tapered rollers 4 at equal intervals in the circumferential direction of the tapered roller bearing 1. The outer ring 2, the inner ring 3, and the cage 17 have annular (short cylindrical) shapes that share an axis C as a center line.

The outer ring 2 has an outer peripheral face 23 formed in a cylindrical shape, and a large end face 21 and a small end face 22 that are located respectively at the opposite axial ends of the outer ring 2 and formed as flat faces perpendicular to the axis C. The outer raceway surface 16 is formed in a tapered shape, and a small-diameter-side thereof (left side in FIG. 1) is continuous with an inner periphery cylindrical face 31 that is formed centering around the axis C so as to extend parallel to the axis C. The outer ring 2 is made of bearing steel. After quench hardening is performed, the outer peripheral face 23, the large end face 21, the small end face 22, the outer raceway surface 16, and the inner periphery cylindrical face 31 are finished by grinding.

The inner ring 3 has an inner peripheral face 25 formed in a cylindrical shape, and a large end face 26 and a small end face 27 that are located respectively at the opposite axial ends of the inner ring 3 and formed as flat faces perpendicular to the axis C. The inner raceway surface 11 is formed in a tapered shape. On a large-diameter-side (right side in FIG. 1) of the inner raceway surface 11, a rib face 28 is formed so as to extend in a direction substantially perpendicular to the inner raceway surface 11 in a section taken along the axial direction of the tapered roller bearing 1 (section including the axis C). A cylindrical face 29 is formed between the radially outer side portion of the rib face 28 and the radially outer side portion of the large end face 26. A cylindrical face 24 centering around the axis C and extending parallel to the axis C is formed on the small end face 27-side portion of the outer periphery of inner ring 3. A small rib 14 having an outside diameter slightly larger than that of the cylindrical face 24 is formed between the cylindrical face 24 and the inner raceway surface 11. The inner ring 3 is made of bearing steel. After quench hardening is performed, the inner peripheral face 25, the large end face 26, the small end face 27, the inner raceway surface 11, the rib face 28, and the cylindrical face 24 are finished by grinding.

Each tapered roller 4 has a generally circular truncated cone shape, and a rolling contact surface 41 located on the outer periphery thereof is formed into a tapered shape by grinding. The outer ring 2 and the inner ring 3 are coaxially assembled together such that the outer raceway surface 16 and the inner raceway surface 11 face each other in the radial direction. The tapered rollers 4 are rollably interposed between the outer raceway surface 16 and the inner raceway surface 11. Out of opposite end faces 42, 43 of each tapered roller 4, the large-diameter-side end face 42 is formed by grinding, and comes into sliding contact with the rib face 28 of the inner ring 3.

The cage 17 is manufactured by subjecting a synthetic resin such as polyphenyl sulfide or polyamide to injection molding. The cage 17 has a small-diameter annular portion 5, a large-diameter annular portion 6, and a plurality of cage bars 7 arranged at equal intervals in the circumferential direction. The small-diameter annular portion 5 and the large-diameter annular portion 6 are connected to each other by the cage bars 7. The axial direction of each cage bar 7 substantially coincides with that of the tapered roller 4. One tapered roller 4 is disposed in a space between the cage bars 7 adjacent to each other. A space surrounded by the cage bars 7 adjacent to each other, the annular portion 5, and the annular portion 6 is referred to as a pocket. The inner walls of the pocket, which face each other in the circumferential direction, are close to the rolling contact surface 41 of the tapered roller 4, and the inner walls of the pocket, which face each other in the axial direction, are respectively close to the end faces 42, 43 of the tapered roller 4 in the axial direction. The cage 17 is positioned in the radial direction and the axial direction as the walls of pocket come into contact with the tapered roller 4. In this way, the cage 17 is positioned as the cage 17 comes into contact with the tapered rollers 4. However, certain amounts of clearances need to be left between the cage 17 and the tapered rollers 4 in order to allow the tapered rollers 4 to roll smoothly. Thus, a certain amount of clearance needs to be left between the cage 17 and each of the outer and inner rings 2, 3 to prevent contact between the cage 17 and the outer and inner rings 2, 3 during rotation of the tapered roller bearing 1. When the inner ring 3 rotates and thus the tapered rollers 4 make a revolving motion, the cage 17 makes a revolving motion under the guidance of the tapered rollers 4. Thus, the cage 17 rotates coaxially with the outer ring 2 and the inner ring 3.

The shape of the small-diameter-side annular portion 5 of the cage 17 will be described in detail with reference to FIG. 7. An outer periphery cylindrical face 51 is formed on the outer periphery of the annular portion 5. The outer periphery cylindrical face 51 is continuous with an outer peripheral face of each cage bar 7. The outer periphery cylindrical face 51 of the annular portion 5 is disposed coaxially with the inner periphery cylindrical face 31 formed on the inner periphery of the outer ring 2. The outer periphery cylindrical face 51 and the inner periphery cylindrical face 31 radially face each other across a prescribed clearance and a cylindrical space R parallel to the axis C is formed between the outer periphery cylindrical face 51 and the inner periphery cylindrical face 31.

Figure 7:
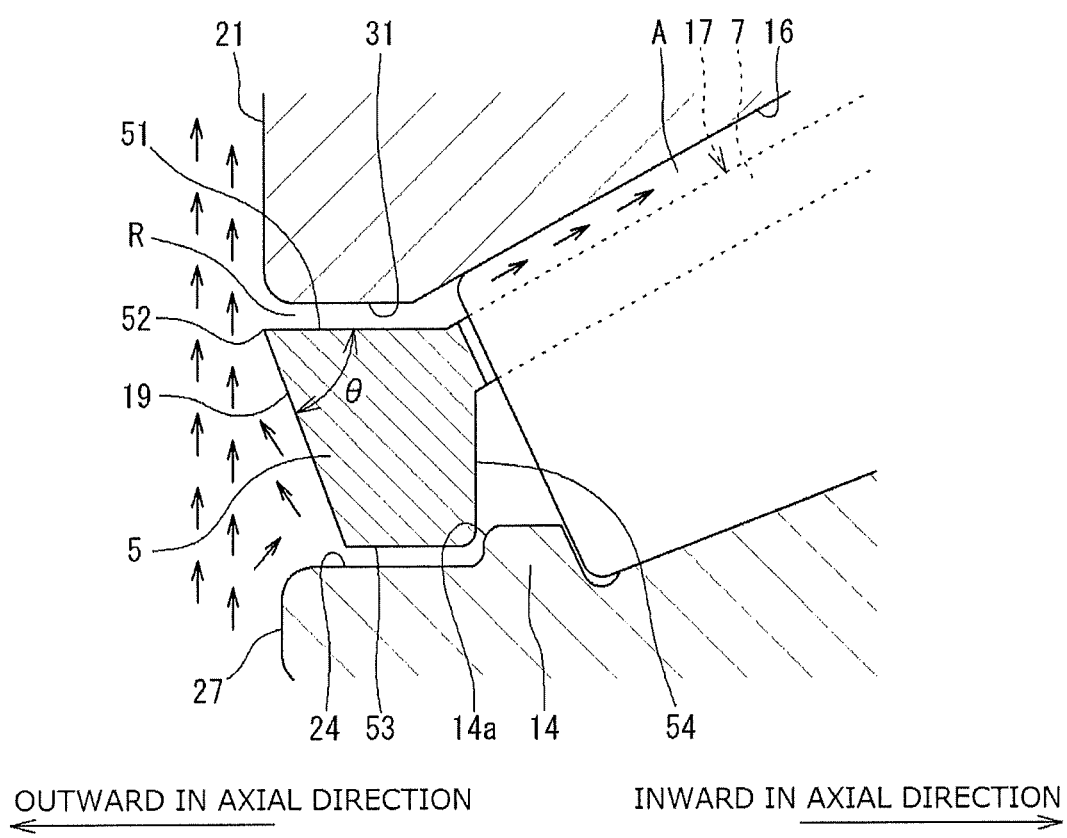
FIG. 7 is an enlarged view of main portions of the tapered roller bearing illustrated in FIG. 6.

As illustrated in a sectional view in FIG. 7, an axially outer end face 19 of the annular portion 5 is formed in a tapered face that meets the outer periphery cylindrical face 51 at an acute angle in a section taken along the axial direction. The cage 17 is incorporated into the tapered roller bearing 1 such that the axial position of a corner 52, which is formed as the outer periphery cylindrical face 51 and the end face 19 meet each other, substantially coincides with the axial position of the large end face 21 of the outer ring 2. The positional relationship between the annular portion 5 and the outer ring 2 will be described below in detail.

An inner peripheral face 53 of the annular portion 5 is formed in a cylindrical face centering around the axis C of the cage 17 and extending parallel to the axis C of the cage 17. The cage 17 is incorporated into the tapered roller bearing 1 such that the inner peripheral face 53 is disposed coaxially with the cylindrical face 24 of the inner ring 3 and the inner peripheral face 53 and the cylindrical face 24 radially face each other across a prescribed clearance. An axially inner side face 54 of the annular portion 5 is a flat face formed so as to be perpendicular to the axis C. The radially outer side portion of the side face 54 is continuous with an inner peripheral face of each cage bar 7.

As described above, when the cage 17 is incorporated in the tapered roller bearing 1, the annular portion 5 is disposed radially outward of the small rib 14 formed on the outer periphery of the inner ring 3, and the axially inner side face 54 of the annular portion 5 faces an axially outer side face 14a of the small rib 14 across a small clearance. As described above, the inner peripheral face 53 of the annular portion 5 faces the cylindrical face 24 on the outer periphery of the inner ring 3 across a prescribed clearance. In this way, a labyrinth is formed between the inner peripheral side of the annular portion 5 and the outer peripheral side of the inner ring 3.

Next, the flows of oil during rotation of the inner ring 3 will be described with reference to FIG. 7. In the following description, with regard to the tapered roller bearing 1, the side on which the small end face 27 of the inner ring 3 is located will be referred to as "small diameter side", and the side on which the large end face 26 of the inner ring 3 is located will be referred to as "large diameter side". In the final reduction gear unit of the automobile in which the tapered roller bearing 1 is used, the oil stored in a differential case is thrown up due to the rotation of the gear and thus a large amount of oil is supplied to the tapered roller bearing 1 that supports the pinion shaft.

During the rotation of the inner ring 3, the oil in the bearing (more specifically, the oil present between the tapered rollers 4 adjacent to each other) is moved radially outward toward the outer raceway surface 16 by a centrifugal force. Due to the tapered shape of the outer raceway surface 16, the oil moves along the outer raceway surface 16 toward the large diameter side. As described above, in the tapered roller bearing 1, so-called pumping action is generated, so that the oil flows through the tapered roller bearing 1 from the small diameter side to the large diameter side.

When the amount of oil that flows through the tapered roller bearing 1 is too large, the rotary torque increases due to stirring resistance generated as the tapered rollers 4 stir the oil, so that power loss of a device (in this case, the final reduction gear unit) provided with the tapered roller bearing 1 increases. On the other hand, when the amount of oil that flows through the tapered roller bearing 1 is too small, it is not possible to sufficiently lubricate a sliding contact region where the tapered rollers 4 and the outer ring 2 or the inner ring 3 are brought into sliding contact with each other. This may cause, for example, seizure.

Under the pumping action, the oil flows into the tapered roller bearing 1 through an opening between the outer ring 2 and the inner ring 3, which is located on the small diameter side of the tapered roller bearing 1. As illustrated in FIG. 7, the small-diameter-side annular portion 5 of the cage 17 is located in the opening. Therefore, in order to reduce the amount of oil that flows through the tapered roller bearing 1, it is necessary to reduce both the amount of oil flowing into the tapered roller bearing 1 from the outer peripheral side of the annular portion 5 and the amount of oil flowing into the tapered roller bearing 1 from the inner peripheral side of the annular portion 5.

The inflow of oil from the inner peripheral side of the annular portion 5 will be described below. As described above, the labyrinth is formed between the inner peripheral side of the annular portion 5 and the outer periphery of the inner ring 3. Therefore, even if the dimensional accuracy of the cage 17 is not strictly set, it is possible to reduce the amount of oil flowing into the tapered roller bearing 1 from the inner peripheral side of the annular portion 5 as long as the clearance between the annular portion 5 and the inner ring 3 is within a certain range. Because the advantageous effects produced by the structure of this portion are described in JP 2005-69421 A, the detailed description thereon will be omitted.

Next, the inflow of oil from the outer peripheral side of the annular portion 5 will be described. In the tapered roller bearing 1, the oil in a clearance between the cage bars 7 of the cage 17 and the outer raceway surface 16 (hereinafter, referred to as "clearance A") flows from the small diameter side toward the large diameter side due to a centrifugal force. Therefore, in the related art, the oil present between the cage 17 and the outer ring 2, at a position at the small-diameter-side end portion of the cage 17, is drawn by the flow of oil in the clearance A and thus guided to the clearance A. As a result, it is not possible to sufficiently reduce the amount of oil that flows through the tapered roller bearing 1.

Therefore, in the reference invention, the outer periphery cylindrical face 51 extending parallel to the axis C is formed on the outer periphery of the annular portion 5, at a position at the small-diameter-side end portion of the cage 17, and the cylindrical space R is formed between the outer periphery cylindrical face 51 and the inner periphery cylindrical face 31 extending parallel to the axis C. The cylindrical space R is defined by the inner periphery cylindrical face 31 that is a cylindrical face defined by a generating line parallel to the axis C. As a result, even when a centrifugal force is applied to the oil in the cylindrical space R, the oil does not flow actively from the small diameter side to the large diameter side unlike in the case of a tilted face.

In addition, in the reference invention, the end face 19 of the cage 17 tilts outward in the axial direction from the radially inner side toward the radially outer side, and the axial position of the tip (edge) of the corner 52 substantially coincides with the axial position of the large end face 21 of the outer ring 2. Thus, when the oil thrown up onto the end face 19 of the annular portion 5 due to the rotation of the gear is splashed outward by a centrifugal force, the direction in which the oil is scattered is a direction away from the large end face 21 of the outer ring 2. In this way, the oil is prevented from flowing into the cylindrical space R.

The flow of oil flowing radially outward along the end face 19 departs from the end face 19 at the corner 52, so that a region in which the pressure is low (low pressure region) is formed on the back side of the corner 52 (right side of corner 52, in FIG. 7). The axial position of the corner 52 substantially coincides with the axial position of the large end face 21 of the outer ring 2. Therefore, the low pressure region is formed at the large end face 21-side opening of the cylindrical space R.

The oil flows toward the low pressure side, and thus the oil present in the cylindrical space R flows from the inside of the tapered roller bearing 1 toward the large end face 21. This reduces the amount of oil drawn from the cylindrical space R toward the clearance A. As a result, the inflow of oil from the outer peripheral side of the annular portion 5 is reduced.

The size of the low pressure region varies depending on, for example, the rotational speed of the cage 17 and the temperature of the oil. FIG. 8 is a graph illustrating the results of numerical analysis that was performed while changing the axial position of the corner 52 of the cage 17 with respect to the large end face 21 of the outer ring 2 under the conditions of ordinary use of the final reduction gear unit of the vehicle, the conditions that the rotational speed of the inner ring 3 is 5000 rpm, the temperature of the oil is 80° C., and the radial clearance of the cylindrical space R is 0.65 mm, and the condition that the outer ring 2 is fixed and the cage 17 makes a revolving motion under the guidance of the tapered rollers 4 in response to the rotation of the inner ring 3. The ordinate axis in FIG. 8 represents the amount (flow rate) of oil flowing through the cylindrical space R. In the graph, as illustrated on the lower side (abscissa axis), the position of the end face of the cage 17 (the position of the tip of the corner 52) when it coincides with the axial position of the large end face 21 of the outer ring 2 is set to zero, and the direction in which the position of the end face of the cage 17 (the position of the tip of the corner 52) is offset further outward from the large end face 21 of the outer ring 2 is defined as a positive (+) direction. According to the results, it was confirmed that the optimum range of the distance by which the corner 52 is offset from the large end face 21 in the axial direction is a range from zero mm to one mm.

In addition, numerical analysis was performed while changing an angle θ (refer to FIG. 7) formed between the end face 19 and the axis C in a section taken along the axial direction. According to the results, it was confirmed that the effect of reducing the flow rate is significant when the angle θ is within a range from 45° to 75°.

As can be understood from the above description, in the tapered roller bearing 1 according to the reference invention, the amount of oil flowing into the tapered roller bearing 1 is restricted by filling the clearance, through which the oil flows, with the oil low pressure region, on the outer peripheral side of the cage 17. This makes it possible to reduce the amount of oil flowing through the tapered roller bearing 1 from the small diameter side to the large diameter side without strictly controlling the dimensional accuracy of the cage 17. As a result, it is possible to provide the tapered roller bearing in which the stirring resistance of the oil is lowered and thus the rotary torque during rotation is reduced.

In the tapered roller bearing 1 according to the invention, as described above (refer to FIG. 7), the axial position of the tip of the corner 52 needs to be a position that substantially coincides with the axial position of the large end face 21 of the outer ring 2. As described above with reference to FIG. 8, as the "position that substantially coincides with the axial position of the large end face 21", a position where the distance by which the tip of the corner 52 is offset outward from the large end face 21 in the axial direction (hereinafter, referred to as "offset distance") is equal to or shorter than one mm is the optimum position. However, even when the distance by which the tip of the corner 52 is offset outward from the large end face 21 in the axial direction exceeds one mm, if the offset distance is equal to or shorter than 2.6 mm, as illustrated in FIG. 8, it is possible to restrict the inflow of oil into the tapered roller bearing 1 from the outer peripheral side of the annular portion 5. In other words, a position where the offset distance is equal to or shorter than 2.6 mm may be included in the examples of the "position that substantially coincides with the axial position of the large end face 21". Needless to say that, the examples of the "position that substantially coincides with the axial position of the large end face 21" include a position at which the offset distance is zero (0), that is, a position at which the axial position of the large end face 21 and the axial position of the tip of the corner 52 coincide with each other.

In the tapered roller bearing 1 according to the reference invention, the axial position of the tip of the corner 52 needs to substantially coincide with the axial position of the large end face 21 of the outer ring 2. The examples of the "position that substantially coincides with the axial position of the large end face 21" include a position at which the tip of the corner 52 is slightly offset inward from the large end face 21 of the outer ring 2 in the axial direction (slightly offset from the large end face 21 of the outer ring 2 in a direction toward the inside of the tapered roller bearing 1, in which the tapered rollers 4 are disposed). In other words, the direction in which the position of the end face of the cage 17 is offset from the large end face 21 of the outer ring 2 may be a negative (−) direction. Examples of the "position that substantially coincides with the axial position of the large end face 21" when the position of the end face of the cage 17 is offset from the large end face 21 in the negative direction include a position at which the offset distance is within a range from −0.4 mm to zero mm (a position at which the absolute value of the offset distance is equal to or smaller than four mm and larger than zero mm). In this case as well, it is possible to restrict the inflow of oil into the tapered roller bearing 1 from the outer peripheral side of the annular portion 5 (refer to FIG. 8). In other words, the examples of the "position that substantially coincides with the axial position of the large end face 21" include a position at which the offset distance is within the range from −0.4 mm to zero mm.

Figure 12:
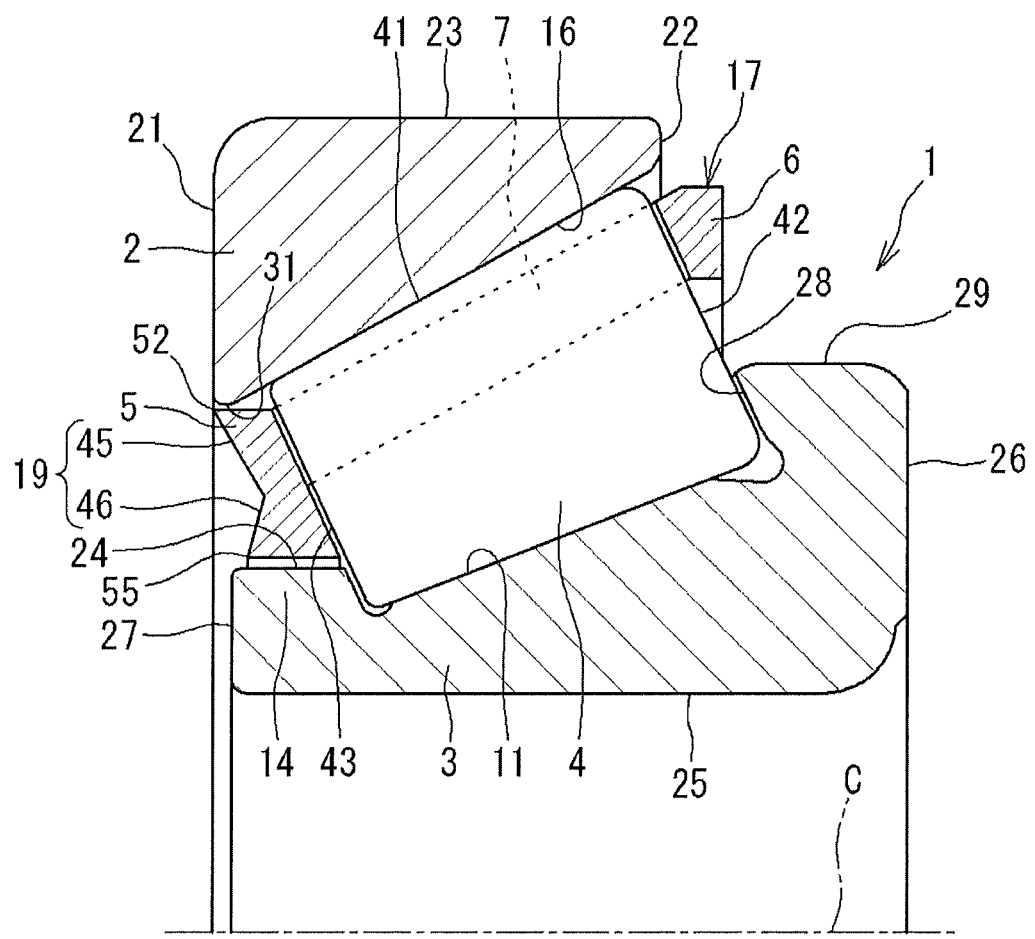
FIG. 12 is a sectional view illustrating a modified example of the tapered roller bearing illustrated in FIG. 1.

FIG. 12 is a sectional view illustrating a modified example of the tapered roller bearing 1 illustrated in FIG. 1. The tapered roller bearing 1 illustrated in FIG. 12 is the same as the tapered roller bearing 1 illustrated in FIG. 1 except for the shape of the inner peripheral face of an outer ring 2. The difference will be described below in detail. The axial length of the inner periphery cylindrical face 31 of the outer ring 2 illustrated in FIG. 12 is shorter than that of the inner periphery cylindrical face 31 of the outer ring 2 illustrated in FIG. 1. The axial length of the inner periphery cylindrical face 31 of the outer ring 2 illustrated in FIG. 12 may be set further shorter. The inner periphery cylindrical face 31 may be omitted, and an outer raceway surface 16 may be continuous with a large end face 21 (via a rounded face or a chamfer).

The tapered roller bearing 1 according to the invention is not limited to the ones described in the above embodiments illustrated in the drawings, and various modifications may be made within the scope of the invention. In each of the above-described embodiments of the invention and the reference invention, the cage 17 is positioned in the axial direction by the tapered rollers 4 as described above. The comparison between the axial position of the axially outer end face 19 (tips of corners 52, 55) of the annular portion 5 and the axial position of the outer ring 2 or the inner ring 3 is made in a state where the cage 17 is positioned with the annular portion 5 located at the innermost possible position in the axial direction. For example, when the axial position of the tip of the corner 52, which is the outer periphery end portion, is compared with the axial position of the large end face 21 of the outer ring 2, the comparison is performed in a state where the annular portion 5 is located at the innermost possible position in the axial direction. When the axial position of the tip of the corner 55, which is the inner periphery end portion, is compared with the axial position of the small end face 27 of the inner ring 3, the comparison is performed in a state where the annular portion 5 is located at the innermost possible position in the axial direction.

According to the invention, it is possible to further restrict inflow of oil into the tapered roller bearing through the radially-inner clearance formed between the outer peripheral face of the inner ring and the inner peripheral face of the small-diameter-side end portion of the cage, thereby reducing the stirring resistance of the oil during rotation of the tapered roller bearing.

What is claimed is:

1. A tapered roller bearing comprising:
an outer ring including a tapered outer raceway surface formed on an inner peripheral face of the outer ring;
an inner ring including a tapered inner raceway surface formed on an outer peripheral face of the inner ring;
a plurality of tapered rollers rollably disposed between the outer raceway surface and the inner raceway surface; and
a cage holding the plurality of tapered rollers at equal intervals in a circumferential direction of the tapered roller bearing, the cage including:
  a small-diameter-side inner periphery end portion located at a position inward of an axially outer end face of the inner ring in an axial direction of the tapered roller bearing,
  a small-diameter-side end face including an inwardly tilted face and an outwardly tilted face, the inwardly tilted face being tilted inward in the axial direction of the tapered roller bearing with respect to the inner periphery end portion from a radially inner side to a radially outer side, and
  a small-diameter-side outer periphery end portion including a corner at which the outwardly tilted face and a small-diameter-side outer peripheral face meet each other at an acute angle.

2. The tapered roller bearing according to claim 1, wherein:
the inwardly tilted face is formed in a radially inner region of the small-diameter-side end face, and the outwardly tilted face is formed in a radially outer region of the small-diameter-side end face; and
an axial position of a tip of the corner is set at a position that substantially coincides with an axial position of an end face of the outer ring.

3. A tapered roller bearing comprising:
an outer ring including a tapered outer raceway surface formed on an inner peripheral face of the outer ring;
an inner ring including a tapered inner raceway surface formed on an outer peripheral face of the inner ring;
a plurality of tapered rollers rollably disposed between the outer raceway surface and the inner raceway surface; and
a cage holding the plurality of tapered rollers at equal intervals in a circumferential direction of the tapered roller bearing, the cage including:
  a small-diameter-side inner periphery end portion located at a position inward of an axially outer end face of the inner ring in an axial direction of the tapered roller bearing,
  a small-diameter-side end face including an inwardly tilted face and an outwardly tilted face, the inwardly tilted face being tilted inward in the axial direction of the tapered roller bearing with respect to the inner periphery end portion from a radially inner side to a radially outer side, and
  a small-diameter-side outer periphery end portion including a corner at which the outwardly tilted face and a small-diameter-side outer peripheral face are directly adjacent to each other at an acute angle.

4. The tapered roller bearing according to claim 3, wherein:
the inwardly tilted face is formed in a radially inner region of the small-diameter-side end face, and the outwardly tilted face is formed in a radially outer region of the small-diameter-side end face; and
an axial position of a tip of the corner is set at a position that substantially coincides with an axial position of an end face of the outer ring.

* * * * *